Dec. 8, 1964    P. M. NEWGARD    3,160,045
SENSING DEVICE AND METHOD
Filed Nov. 23, 1960    3 Sheets-Sheet 2
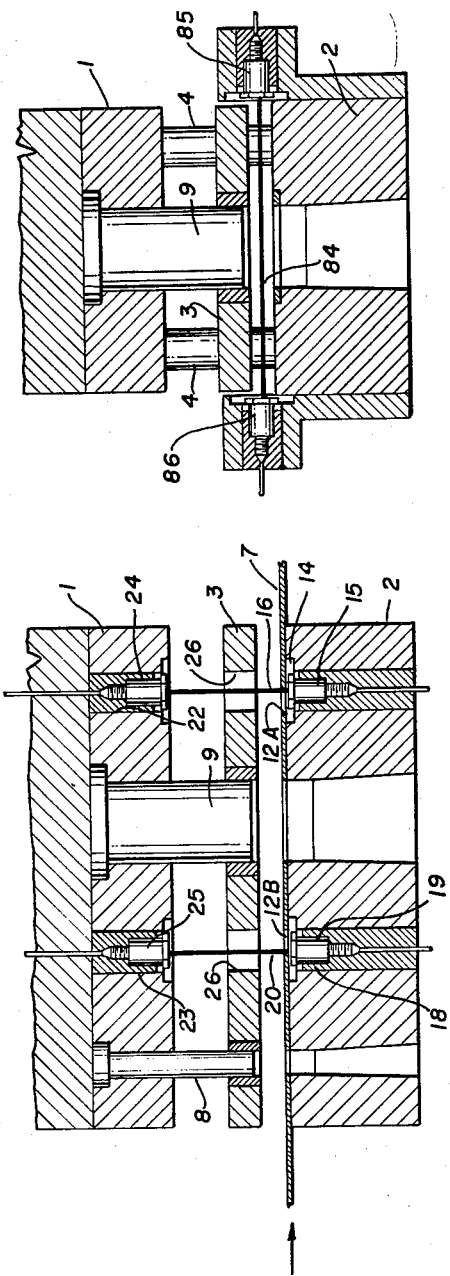
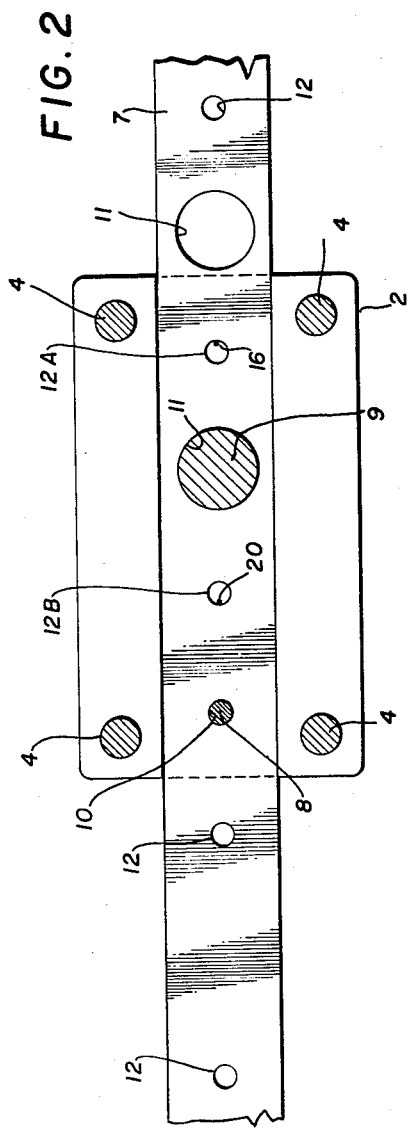
INVENTOR.
P. M. NEWGARD
BY
Boykin, Mohler + Wood.

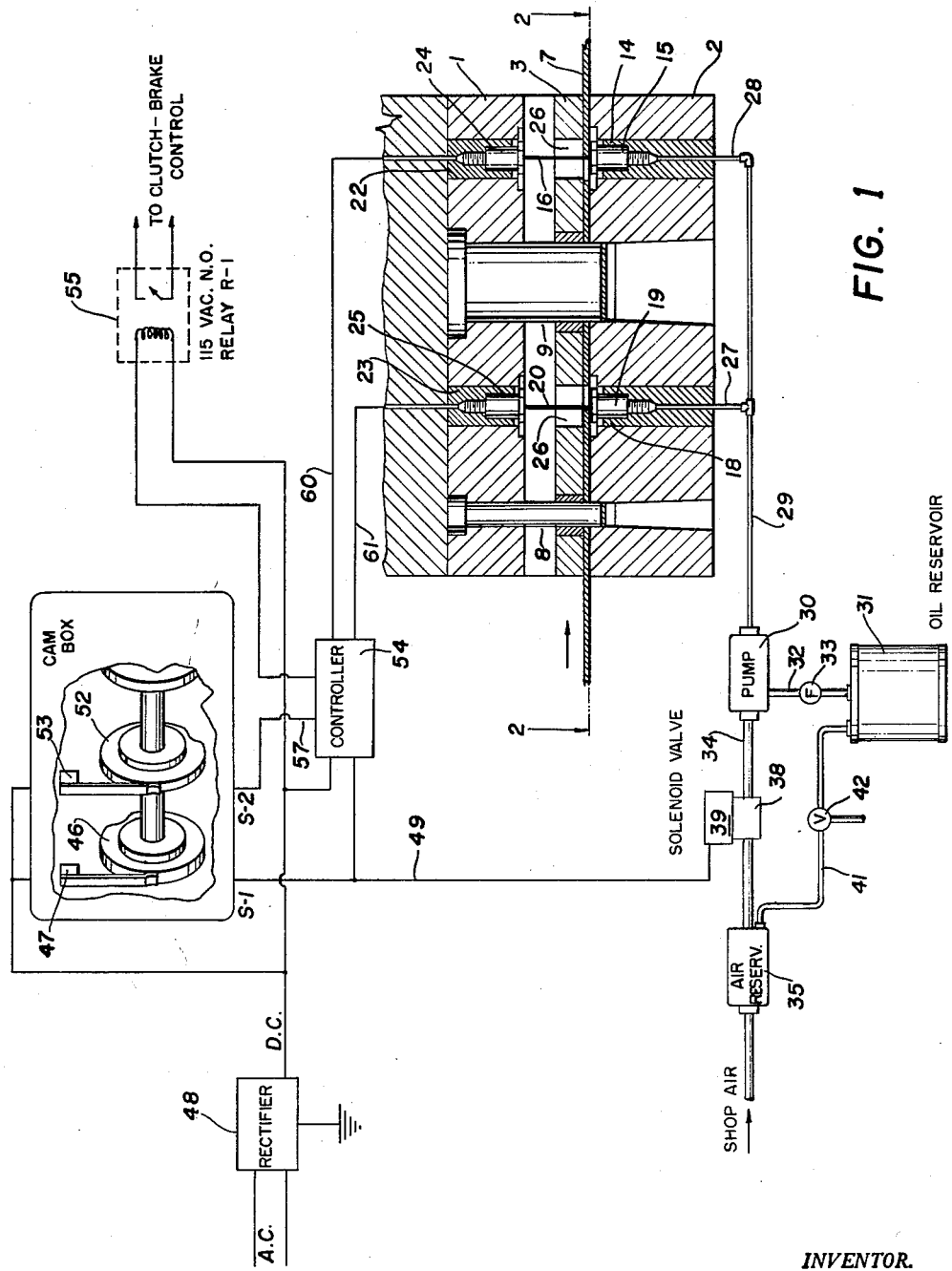

INVENTOR.
P. M. NEWGARD
BY
Boyken, Mohler & Wood

United States Patent Office 3,160,045
Patented Dec. 8, 1964

3,160,045
SENSING DEVICE AND METHOD
Peter M. Newgard, Redwood City, Calif., assignor to
Schlage Lock Company, a corporation
Filed Nov. 23, 1960, Ser. No. 71,321
3 Claims. (Cl. 83—63)

This invention relates to a method and apparatus for detecting the presence or absence of an object at a particular location. The invention will hereafter be described in combination with a punch press for detecting the presence or absence of an object in a location at which it might do damage to the press or, more important, to the associated punches and dies. The particular embodiment herein described in detail operates to stop such a punch press before damage results. It will be apparent, however, that the method and apparatus disclosed has many other uses and applications.

In terms of broad inclusion the present invention contemplates the use of a stream or jet of particles or fluid having sufficient momentum not to be influenced by extraneous conditions so that a pressure responsive means may be employed to detect the continuity of such stream or jet. In the event an object interferes with the jet such pressure responsive means responds by changing the state of whatever mechanism is involved. The reverse application by which the state of the mechanism is changed by the absence of such an object is of course also contemplated by the invention.

Heretofore various methods and devices have been employed to determine the presence or absence of an object at a particular location. One class of such devices may be said to take the form of a switch which is operated by direct contact with the object whose presence is sought to be determined. Another class includes the use of a beam of light and a light responsive device to initiate the opening or closing of an electrical circuit if an object interrupts the beam.

Each of such classes of systems has advantages for particular applications but none is ideally suited for use in exceptionally dirty or oily atmospheres. The switch type of device, aside from the likelihood of its failing by fatigue and its inability to respond at high speeds, is easily clogged or jammed by dirt and other foreign material. The devices employing a beam of light likewise are readily fouled or may readily be actuated by extraneous atmospheric conditions in addition to actuation by the particular object to be sensed.

The main object of the present invention is the provision of a simple, reliable sensing device for detecting the presence or absence of an object and which device is adapted to operate effectively regardless of the presence of atmospheric contaminants and other foreign elements that might impair the operation of other sensing devices presently available.

Another object of the invention is the provision of a method of sensing the presence or absence of an object and which method employs a stream or jet having sufficient momentum to be unaffected by extraneous conditions such as the presence of dirt, an oily atmosphere and other conditions attending the operation of many types of apparatus.

Still another object of the invention is the provision of an apparatus for sensing the presence of an object and which apparatus lends itself to use with high speed machinery so as to stop such machinery before damage results from the presence of such object.

Yet another object of the invention is the provision of a method and apparatus for checking the position of an object as well as detecting the presence of an object. In this connection it will be understood that whether or not an object is in an exact predetermined position can be determined by sensing whether one of two points of an object interferes with a jet of the type contemplated by the present invention. This object will be understood more clearly by consideration of the particular embodiment of the invention to be described.

Other objects and advantages will be apparent from the following specification and from the drawings:

FIG. 1 is a semischematic arrangement of the invention shown applied to a punch press with the latter shown in its lower position;

FIG. 2 is a horizontal section of a portion of the punch press of FIG. 1 showing the position of the two jets relative to the strip to be punched;

FIG. 3 is a longitudinal section of a portion of the punch press with the punch in its upper position;

FIG. 5 is a semischematic transverse section of a punch press showing another form which the invention can take.

Figure 4:
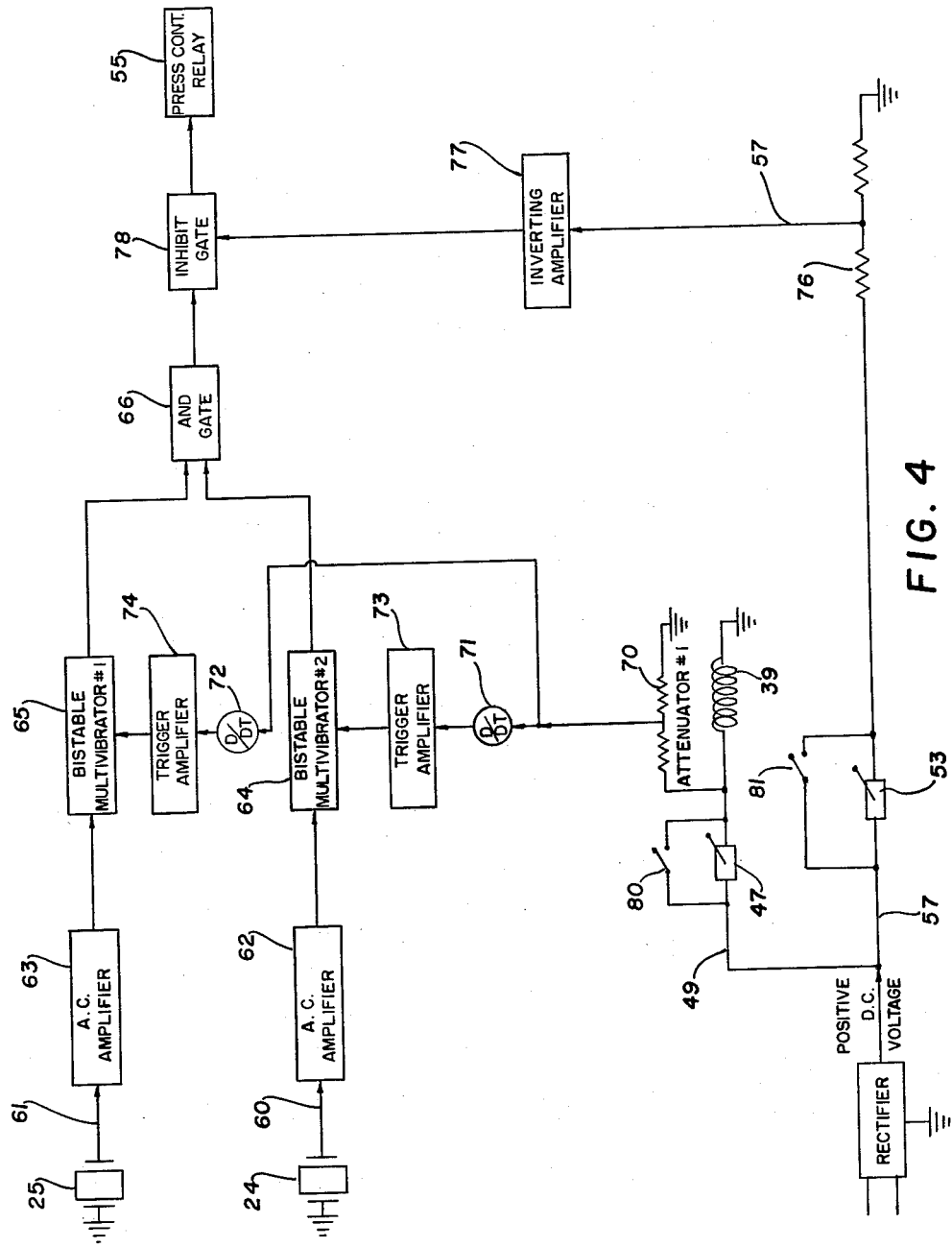
FIG. 4 is a simplified diagram of the controller.

In detail and with reference to FIG. 1 the apparatus of the invention is shown incorporated in a punch press of which there is shown schematically the punch 1, the die 2 and a stripper plate 3. In FIG. 2 there are indicated four vertical guide rods 4 which guide the punch between its upper and lower positions. A strip of material 7 is shown in FIGS. 1, 2 and a pair of punching members 8, 9 are supported on the punch 1 for punching holes 10, 11 respectively in strip 7.

For illustrative purposes it is assumed that the strip 7 is fed intermittently toward the right (FIGS. 1, 2, 3) by means of a conventional feeding device and that holes 10, 11 are punched on each downward movement of the punch. The arrangement of FIG. 1 illustrates one method of employing the invention to determine whether the strip 7 is in the correct position before the larger hole 11 is punched over hole 10 to form a washer. This is done by employing the previously punched holes 12 as guides and by passing jets of fluid such as oil through said holes.

Formed in die 2 is a vertically extending passageway 14 within which is positioned a nozzle 15 adapted to direct a jet 16 of oil upwardly as indicated in FIG. 1. The position of nozzle 15 is such that the jet 16 just clears the leading (right hand) edge of hole 12A when the strip 7 is in its correct position (FIG. 2).

Spaced rearwardly from passageway 14 is a similar passageway 18 adapted to contain a second nozzle 19 for directing a jet of oil 20 upwardly through hole 12B. Nozzle 19 is positioned so that when strip 7 is in its proper position the jet 20 just clears the trailing (left hand) edge of hole 12B. At this point it should be noted that if the strip 7 is not in its correct position relative to its path of travel one or the other of jets 16, 20 will strike strip 7 and will not pass through the associated hole 12. That is, if the strip 7 is too far advanced jet 20 will be interfered with and if the strip is rearwardly of its correct position jet 16 will not pass through hole 12A. Obviously the exact clearance between the jets and the associated edges of the holes 10 will depend on the particular tolerance desired.

Formed in punch 1 are passageways 22, 23 in which are positioned transducers 24, 25 respectively. Suitable holes 26 are formed in stripper plate 3 to receive jets 16, 20. In the particular form of the invention illustrated the transducers 24, 25 are piezoelectric crystals but the invention contemplates other pressure responsive devices. As will be shown later on in greater detail, the function of transducers 24, 25 is to initiate an electrical signal when the associated oil jet strikes them.

The liquid employed to form jets 16, 20 is preferably oil because oil is used in the punching operation. Said oil is conducted to nozzles 15, 19 through pipes 27, 28 which in turn are connected to the discharge line 29 of a pump 30. Pump 30 is preferably of the type having a differential piston. The large end of which is acted on by air to effect an extremely large pressure at the small end which pumps the oil.

Oil is fed into pump 30 through an intake line 32 from a reservoir 31 and preferably a filter 33 is provided in said line 32 since cleanliness of the oil is important to prevent clogging of nozzles 15, 19.

Air is admitted to pump 30 through line 34 from a reservoir 35 in which the air is under pressure at all times. A valve 38 actuated by a solenoid 39 opens line 34 when it is desired to form jets 16, 20. A connecting line 41 between air reservoir 35 and oil reservoir 31 may be used to maintain pressure on the oil in reservoir 31 at all times to insure positive feed of said oil to pump 30. To permit bleeding the system a three-way valve 42 is preferably placed in line 41.

It will be understood that the operating mechanism for punch 1 moves cyclically from a position of top dead center to a position of bottom dead center at which latter point it is shown in FIG. 1. It is therefore desirable that the position of strip 7 be sensed after the strip 7 is fed and before the punch approaches bottom position, assuming, of course, that the apparatus responds quickly enough to shut off the punch before strip 7 is engaged in the event the strip 7 is not properly positioned. To this end a cam 46 is provided in the cam box of the punch press so that at a predetermined point in the cycle of the punch press (preferably at about top dead center) a switch 47 is actuated by cam 46 to energize solenoid 39. As shown in FIG. 1 switch 47 and solenoid 39 are in a D.C. circuit which in turn may be connected through a rectifier 48 to the conventional electric outlet. Thus, for a portion of the cycle after top dead center oil is ejected from nozzles 15, 19 to form jets 16, 20.

A second cam 52 in the cam box of the punch press is employed to close switch 53 in a circuit which causes a signal to be emitted to stop the press unless both transducers 24, 25 are subjected to the pressure of oil jets 16, 20. As will be seen later on, the signal is effective to stop the punch if only one of the transducers is subjected to pressure.

A controller generally designated 54 (FIG. 1) is employed to receive the signals from transducers 24, 25 and to activate a normally open relay 55 which in turn is connected to the clutch-brake control of the punch press.

A preferred form of the controller 54 will be described later on but at this point it may be noted that the circuitry of the controller is such that the impulses created by the closing of switch 53 will energize relay 55 to stop the punch press unless signals are received from both transducers 24, 25 indicating that the pressure from both jets 16, 20 have been applied to them.

The transducers 24, 25 are each grounded to the die 2 and are connected by leads 60, 61 respectively to amplifiers 62, 63 to increase the intensity of the relatively weak pulses emitted from said transducers. The amplified pulses are fed to bistable multivibrators 64, 65 from which the signals are fed to an "And" gate 66 (FIG. 4).

The bistable multivibrators 64, 65 are adapted to be triggered by the pulse received from circuit 49 that is closed by switch 47. To this end the circuit 49 includes an attenuator 70 which reduces the signal in circuit 49 to a level acceptable to the transistors in the remainder of the circuit. The reduced signal from attenuator 70 is applied to two differentiating circuits indicated at 71, 72 respectively which have the effect of giving a negative pulse at the end of that portion of the cycle during which switch 47 is closed by cam 46. Trigger amplifiers 73, 74 invert the signals from differentiating circuits 71, 72 respectively and feed them to bistable multivibrators 64, 65.

The cam 52 closes switch 53 for a relatively short period of time within the longer period of time during which cam 46 closes switch 47. The circuit 57 which is closed by switch 53 includes an attenuator 76 and an inverting amplifier 77. The signal from inverting amplifier 77 is coupled to an "Inhibit" gate 78 of the "And" gate circuit.

The design of the above noted circuitry is such that the bistable multivibrators 64, 65 are triggered into a predetermined stable state by the signals from transducers 24, 25. If such state is achieved the pulse caused by actuation of cam 52 is inhibited by the signal passing through the "And" gate 66 and said pulse is prevented from actuating relay 55. It will be understood that if either one of the transducers 24, 25 is not energized by pressure of the jets the associated multivibrator will remain in a nonoperative state thus causing the pulse due to actuation of cam 52 to actuate relay 55 since it is not inhibited at the "Inhibit" gate 78.

For the purpose of testing the various circuits and devices above described without running the press, switches 80, 81 may be connected in parallel with switches 47, 53.

It will be understood that the above described sensing system is complicated by the fact that two transducers are required to sense the position of the strip 7 as distinguished from the presence or absence of an object. Obviously if the arrangement is such that only one jet is employed to detect the presence of a foreign object one complete transducer circuit may be obviated along with the "And" gate.

A modified form of the invention of the above noted simplified form is shown in FIG. 5. In this case it is merely desired to determine whether a foreign object is in the way of the punch 83, and along the path of travel of jet 84 from nozzle 85 to transducer 86. In such a case it will be understood that one complete transducer circuit is omitted from FIG. 4 along with the gate 66 and it is merely necessary to provide that the pulse from the remaining transducer indicates the absence of the object in order to inhibit the pulse initiated by the cam 52.

It is therefore seen that the invention not only provides a method and apparatus for effectively determining the presence or absence of an object but also for ascertaining whether an object is properly positioned. It will also be noted that the use of two holes to act as guides as above described also detects buckling of the strip as well as improper positioning of the same.

The very specific description herein given of the preferred embodiment of one form of the invention should not be taken as restrictive of the invention as it will be obvious that variations in design may be resorted to by those skilled in the art without departing from the invention.

I claim:

1. The method of determining whether an article is in a predetermined position relative to an established line comprising the steps of: forming a pair of positively pressurized parallel streams of particles having measurable momentum and moving at right angles to and across said line with said streams disposed whereby said article interferes with one of said streams if the article is shifted in one direction along said line from said predetermined position, and interferes with the other of said streams if said article is shifted in the other direction from said predetermined position detecting the pressure of both of said streams on the side of said line opposite the points of origin of said streams, whereby the absence of pressure caused by one or the other of said streams indicates that said article is not in said predetermined position.

2. Apparatus for determining whether an article is in a predetermined position relative to an established line of action, comprising: means for forming a pair of shoulders on said article to define a pair of openings forwardly and rearwardly relative to said line of action, means on one side of such article for establishing a pair of positively pressurized parallel streams of particles having measurable momentum and moving at right angles to and across said line of action, said streams being positioned to just clear said shoulders and to extend through said openings, means on the opposite side of said article responsive to the pressure of said streams, and means for emitting a signal if both of said pressure responsive means do not respond to pressure.

3. In combination with a continuously operating machine in which an operation is performed on an article continuously passing through said machine along a path of travel, detecting means for detecting whether such article is in a predetermined correct position with reference to a pair of openings formed at longitudinally spaced points in said article comprising:

means on one side of said aritcle for establishing a pair of positively pressurized parallel streams of particles having measurable momentum and moving at right angles to and across said path of travel, said streams being positioned to extend through said openings when said article is in its proper predetermined position, means on the opposite side of said article responsive to the pressure of said streams, and means operatively connected with the driving means of said machine and with said pressure responsive means for stopping said machine when one of said streams is interrupted by said article.

References Cited by the Examiner
UNITED STATES PATENTS

| | | | |
|---|---|---|---|
| 1,991,423 | 2/35 | Shaver | 83—63 |
| 2,165,302 | 7/39 | Radenda | 324—22 |
| 2,248,043 | 7/41 | Degnan | 340—259 |
| 2,319,219 | 5/43 | Draper et al. | 340—261 |
| 2,424,555 | 7/47 | Curtis | 83—61 |
| 2,498,193 | 2/50 | Anglo | 116—67 |
| 2,736,009 | 2/56 | Barnickel | 340—213 |
| 2,772,330 | 11/56 | Higgins | 340—261 |
| 2,824,920 | 2/58 | Humphreys | 200—83 |
| 2,853,574 | 9/58 | Quirk | 200—46 |

ANDREW R. JUHASZ, *Primary Examiner*.

CARL W. TOMLIN, *Examiner*.